(Model.)

A. MUIR.
Milling Cutter.

No. 241,695. Patented May 17, 1881.

Witnesses:
Donn P. Twitchell
C. Sedgwick

Inventor:
A. Muir
By Munn & Co
Attorneys.

UNITED STATES PATENT OFFICE.

ALFRED MUIR, OF MANCHESTER, COUNTY OF LANCASTER, ENGLAND.

MILLING-CUTTER.

SPECIFICATION forming part of Letters Patent No. 241,695, dated May 17, 1881.

Application filed November 15, 1880. (Model.)

*To all whom it may concern:*

Be it known that I, ALFRED MUIR, of Manchester, in the county of Lancaster, England, have invented a new and useful Improvement in Milling-Cutters, of which the following is a specification.

My invention is applicable to cylindrical milling-cutters and globe-shaped cutters, and to cylindrical cutters having curved, rounded, taper, or flat ends, also to face-cutters and to reamers of any of the shapes above mentioned, and to flat cutters.

I form the teeth on the cutter or reamer in the usual way, and then make spiral grooves around it, thus dividing the faces of the cutting-edges. In making the spiral groove the edge is undercut to make clearance at one side, and I afterward cut out the other side of the groove, and thus give clearance at both sides of the cutting-edges.

In making flat cutters or tools for planing, turning, or other machines, instead of taking one unbroken cut, as is usual—say, in traverse from one-sixty-fourth of an inch upward—my improvement consists in making a cutting-tool as wide as is found most convenient for the work under operation. I divide the cutting-edge into several parts. For instance, in taking a cut off a surface of six inches wide in a planing-machine, my tool will be about five and one-half inches wide, and, by forming grooves in this tool, by two movements of the table and by traversing the tool across by two movements the work is done.

Of course I do not limit myself to the above traverse. Whatever traverse is now done by one unbroken cutting-edge, this may be improved upon by my invention by increasing the width of the cutting-edge and putting in one or more grooves.

In forming the milling cutters, reamers, or other tools, they may be built up, instead of being made in one piece.

Figure 1:
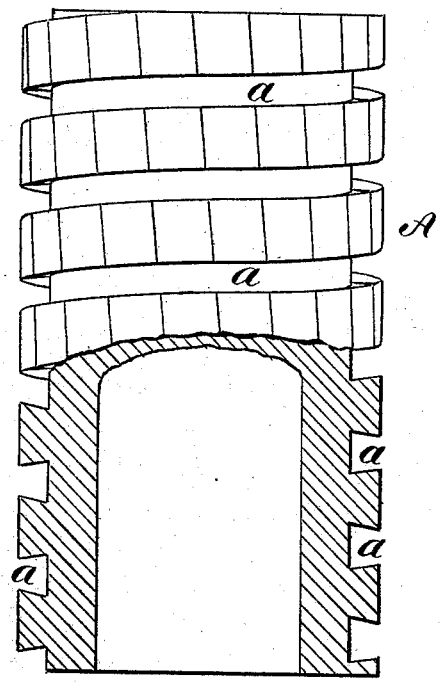
Figure 2:
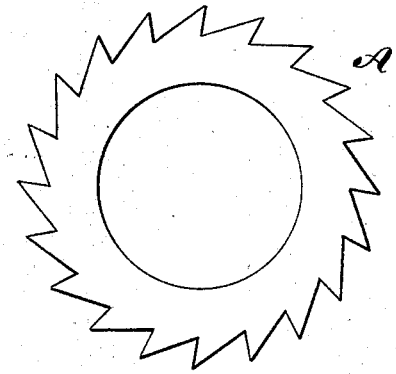
Figure 3:
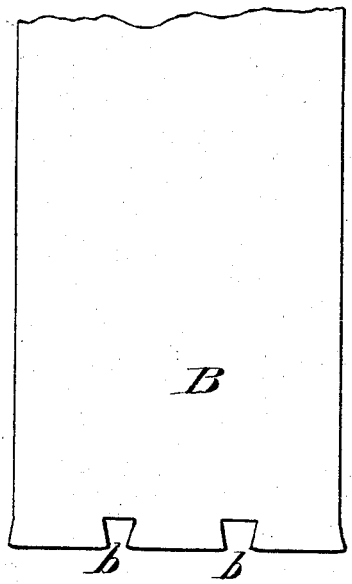

In the accompanying drawings, Figure 1 is an elevation, partly in section, and Fig. 2 an end view of a milling-cutter made in accordance with my invention, and Fig. 3 is an elevation of a flat cutter embodying the invention.

Similar letters of reference indicate corresponding parts.

A, Figs. 1 and 2, is the cylindrical milling-tool, the teeth of which are first formed in the usual way, and then the spiral groove a, having undercut edges, is formed around the surface, thus dividing the cutting-faces. The flat cutter B, Fig. 3, has grooves b formed in its cutting-edge. The cross-sections of the spiral groove a and the grooves b are of similar shape—that is, of dovetail form—to give clearance.

I am aware that prior to my invention milling-cutters have been made with one or more grooves extending around them. I therefore do not claim a groove or grooves made in milling cutters or reamers in the ordinary manner; but

What I claim is—

The milling or reaming tool described, provided with a spiral groove widest at the bottom and narrowing toward the top, to give the teeth a perfect clearance on both sides, as shown and described.

ALFRED MUIR.

Witnesses:
GEORGE ALBERT LIVSEY,
H. B. BARLOW.